G. L. Day,
Planing Shingles.

No. 317.    Patented July 29, 1837.

UNITED STATES PATENT OFFICE.

GEO. L. DAY, OF UNION, NEW YORK.

MACHINE FOR DRESSING OR SMOOTHING SAWED SHINGLES, SIDING, AND OTHER SIMILAR STUFF.

Specification of Letters Patent No. 317, dated July 29, 1837.

*To all whom it may concern:*

Be it known that I, GEORGE L. DAY, of Union, in the county of Broome and State of New York, have invented an Improved Machine for Dressing or Smoothing Sawed Shingles and Siding, and other Stuff of a Similar Kind; and that the following is a full and exact description thereof.

Figure 2:
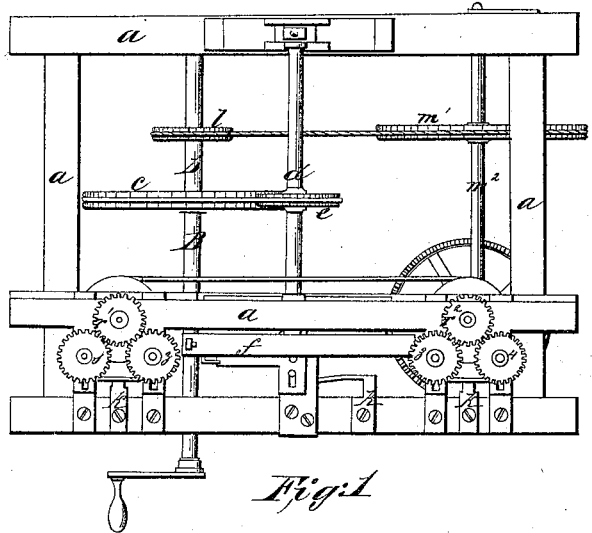
Figure 1:
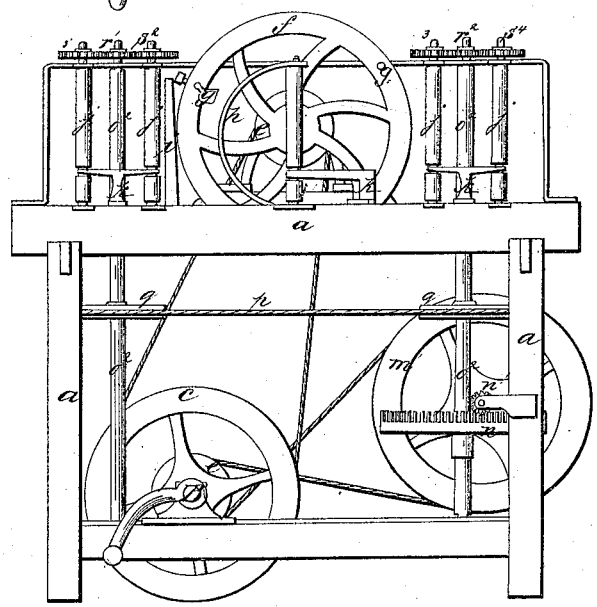

In the accompanying drawing, Figure 1, represents a front view of the machine, and Fig. 2, a top view, the same letters of reference in each of the figures serving to designate the same parts.

The dressing is to be effected by cutters placed upon a cutter wheel revolving vertically, having gouge-formed knives upon its face.

$a$, $a$, $a$, represents the frame work of the machine.

$b$ is a shaft to which the propelling power is to be applied; a band wheel $c$, upon this shaft carries the shaft $d$, of the cutter wheel, by means of the whirl $e$; $f$, is the cutter wheel, and $g$, $g$, cutters on its face, in such number as may be preferred. $h$, is a guide piece, or support, against which the shingle, etc., is to be pressed by means of the outer guide rollers, serving, like the face of a plane, to sustain the stuff as the cutter operates upon it, the cutters being set more or less rank, according to circumstances; there is also a vertical piece, $i$, affixed to the frame, outside of the cutter, which performs the same office without the cutter, that the curved piece, $h$, performs within it. The feeding rollers, $j$, $j$, are in pairs, the hind ones simply revolving on their gudgeons, while the fore ones have their gudgeons in slots, and are borne up by springs $k$, $k$, so as to press upon the sawed shingle, or other article to be smoothed, and which is to be fed in between them.

To give motion to the feeding rollers, there is a whirl $l$, on the first horizontal shaft $b$, a band from which passes around a wheel $m'$, on the second horizontal shaft, $m^2$; this shaft carries a pinion $n'$ that takes into the crown wheel $n$, on the vertical shaft $o'$; $o^2$, is a similar shaft, receiving its motion from $o'$, by a band $p$, upon whirls $q$, $q$.

Upon the upper end of the shafts $o^1$, $o^2$, there are pinions $r^1$, $r^2$, which gear into the pinions $s^1$, $s^2$, $s^3$, $s^4$, upon the upper ends of the back feed rollers, serving to drive them, and consequently to feed the stuff to the cutters.

As the relative motion of the respective parts is a point of considerable importance in the due operation of those machines, I will state the dimensions of certain parts, which after numerous experiments I have found to answer well in practice. The band wheel $c$, is twenty inches in diameter, the whirl $e$, five inches. The cutter wheel eighteen inches. The whirl $l$, six inches, the wheel $m'$, eighteen inches. The pinion on the second horizontal shaft has six leaves, and the crown wheel $n$, sixty teeth. The pinions $r$, $r$, $s$, $s$, are equal in size, and the rollers $j$, $j$, one inch and a half in diameter.

I do not claim to be the inventor of cutter wheels, feeding rollers, or any of the other parts of the within described machine taken individually. but What I do claim is—

The particular manner in which I have combined and arranged the feeding apparatus with the cutter wheel, for the dressing of shingles, siding, and other similar stuff.

GEORGE L. DAY.

Witnesses:
THOS. P. JONES,
ISAIAH P. ROBBINS.